(12) United States Patent
Aydt et al.

(10) Patent No.: US 6,209,945 B1
(45) Date of Patent: Apr. 3, 2001

(54) FOLDING TOP FOR A VEHICLE, ESPECIALLY A PASSENGER CAR

(75) Inventors: Matthias Aydt, Eberdingen; Christof Blech, Renningen, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/206,396

(22) Filed: Dec. 7, 1998

(30) Foreign Application Priority Data

Dec. 6, 1997 (DE) .............................................. 197 54 189

(51) Int. Cl.[7] ........................................................ B60J 7/12
(52) U.S. Cl. ................................... 296/120.1; 296/107.15
(58) Field of Search .............................. 296/107.15, 118, 296/107.09, 107.12, 120.1, 116, 107.16

(56) References Cited

U.S. PATENT DOCUMENTS 5,338,085 * 8/1994 Guckel et al. ........................ 296/121
5,971,470 * 10/1999 May et al. ...................... 296/107.09

FOREIGN PATENT DOCUMENTS

| 19622953 C1 | 8/1997 | (DE) . |
| 0806313 | 11/1997 | (EP) . |

* cited by examiner

Primary Examiner—Joseph D. Pape
Assistant Examiner—Patricia Engle
(74) Attorney, Agent, or Firm—Evenson, McKeown, Edwards & Lenahan, P.L.L.C.

(57) ABSTRACT

A folding top for a vehicle, particularly for a passenger car, comprises a folding top structure, which is pivotally disposed on vehicle-body-side folding top bases and a folding top covering, the folding top structure having a main hoop and at least one control arm connecting a forward folding top section with the folding top base. While the folding top kinematics are simplified, during the opening operation of the folding top, a coordinated movement takes place between the main hoop and of the control arm disposed in front of the main hoop. An adjusting device is arranged between the material-controlled main hoop and the control arm disposed in front thereof and is operative at least during the opening of the folding top.

24 Claims, 4 Drawing Sheets

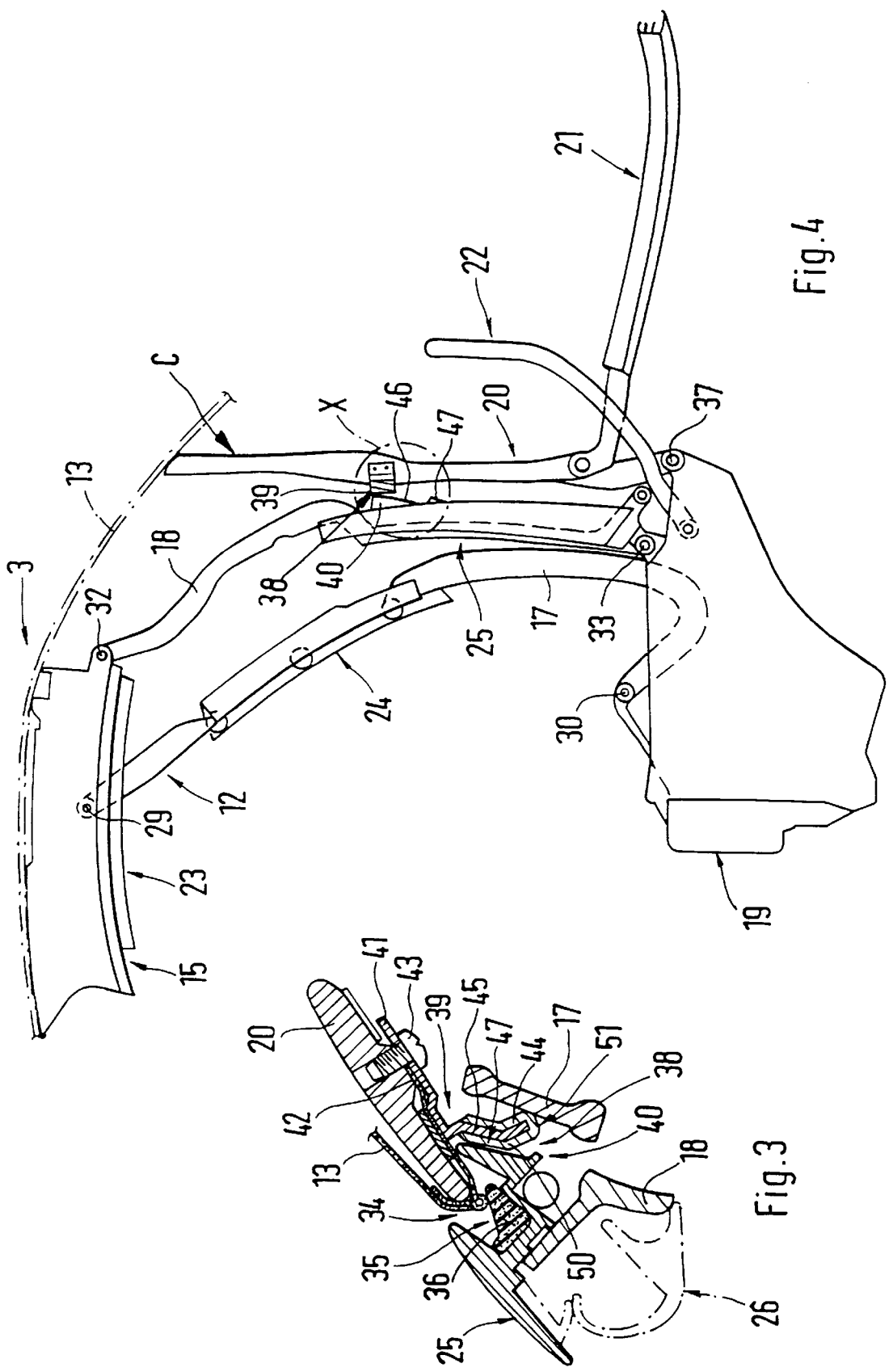

FOLDING TOP FOR A VEHICLE, ESPECIALLY A PASSENGER CAR

BACKGROUND OF THE INVENTION

This application claims the priority of German Patent Application No. 197 54 189.5, filed Dec. 6, 1997, the disclosure of which is expressly incorporated by reference herein.

The invention relates to a folding top for a vehicle, particularly a passenger car having a folding top structure pivotally disposed on the vehicle.

German Patent Document DE 196 22 953 C1 discloses a folding top for a vehicle, particularly a passenger car, having a folding top structure, which is pivotably disposed on folding top bases of a vehicle-body-side. The top structure has a folding top covering and comprises a main hoop, a corner hoop, a rear-side tension bow and a forward folding top section carried on both longitudinal sides by one four bar linkage arrangement respectively. Regarding the folding top kinematics, the two control arms for the forward folding top section form a forward four bar linkage. The main hoop, the rear-side tension bow and a steering control arm form a rearward four bar linkage which, on both longitudinal sides of the folding top, is connected by way of a connecting rod with the forward four bar linkage and the corner hoop.

SUMMARY OF THE INVENTION

It is an object of the invention to further develop a folding top of the above-mentioned type having a construction wherein the kinematics of the folding top is simplified, particularly during the opening operation of the folding top. In addition, a coordinated movement between the main hoop and the control arm disposed in front of it takes place, and the folding top linkage is additionally reinforced in the closed position of the folding top.

The principal advantages achieved by the invention are that, by means of the arrangement of an adjusting device between the main hoop and the control arm disposed in front of the folding top structure, while the main hoop is only material-controlled, a coordinated sequence of movements of the folding top structure is ensured during the opening and closing operation of the folding top. In addition when the folding top is in the closed position, the folding top structure is additionally reinforced or stabilized by the adjusting device. The adjusting device, which is formed of a stop ramp and stop wedge, has a simple construction and can be produced at reasonable cost.

The stop ramp is preferably integrated in the roof frame section of the control arm. As the result of the adjusting device, when the folding top is in the closed position, a defined support takes place between the main hoop and the adjoining control arm in the X, Y and Z direction. In addition, the adjusting device provides a defined end position of the material-controlled main hoop. The adjusting device also ensures perfect entering and exiting of the lateral edge of the folding top cover into and out of corresponding receiving devices of the roof frame sections. Because the main hoop, the corner hoop and the tension bow are only material-controlled, the folding top kinematics have an extremely simple, low-cost construction. During the opening operation of the folding top, starting from a reversal position of the main hoop, the weights of the main hoop, the corner hoop and the tension bow are used for the adjusting movement of the folding top.

Other objects, advantages and novel features of the present invention will become apparent from the following detailed description of the invention when considered in conjunction with the accompanying drawings.

BRIEF DESCRIPTION OF THE DRAWINGS

FIG. 3 is an enlarged sectional view according to Line III—III of FIG. 2;

FIG. 4 is a partial lateral view of the folding top in an intermediate position, the main hoop just taking up its reversal position (dead center position)

DETAILED DESCRIPTION OF THE DRAWINGS

Figure 1:
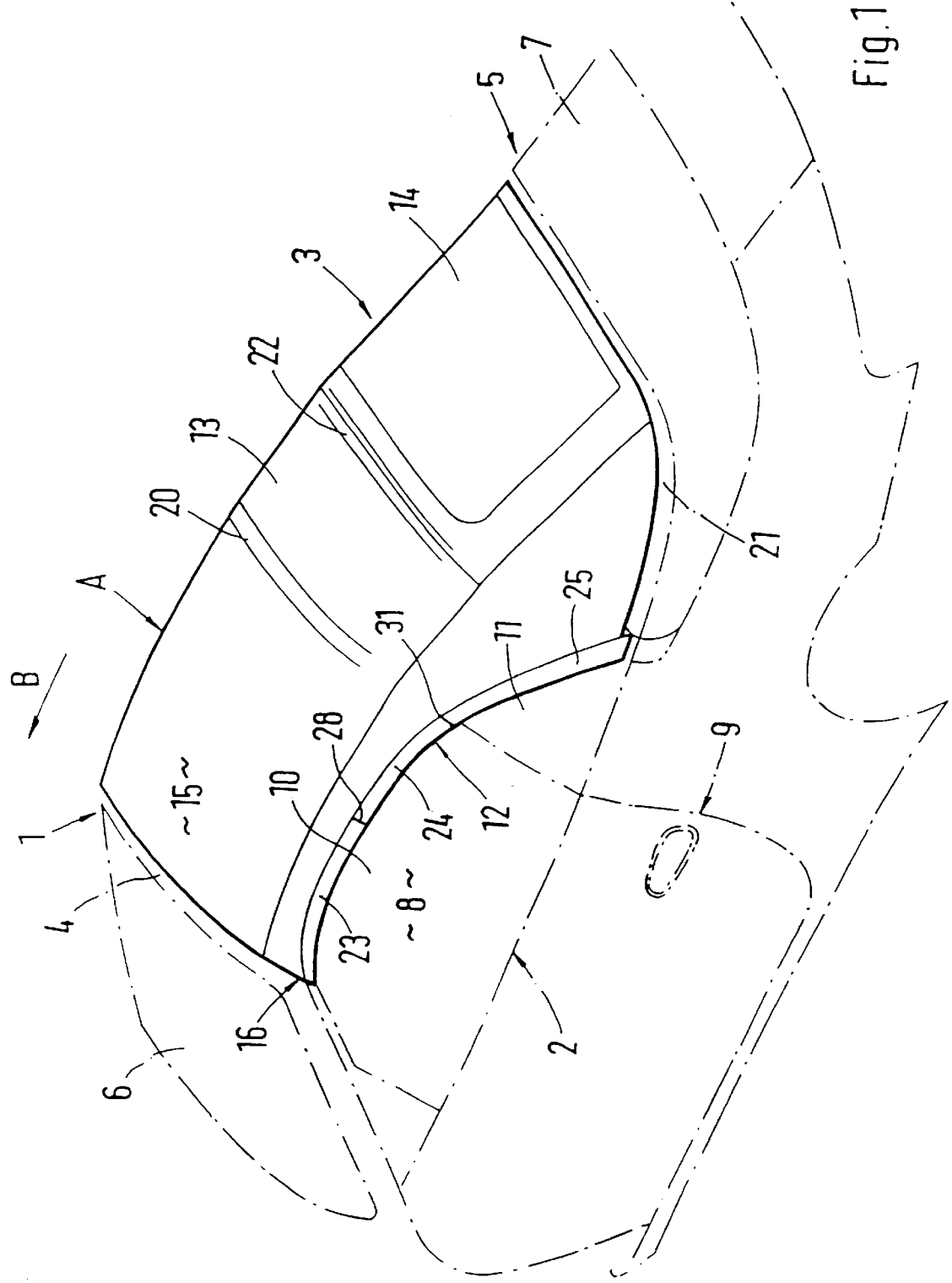
FIG. 1 is a perspective partial view diagonally from behind of the left half of a vehicle with a folding top in the closed position.
Figure 2:
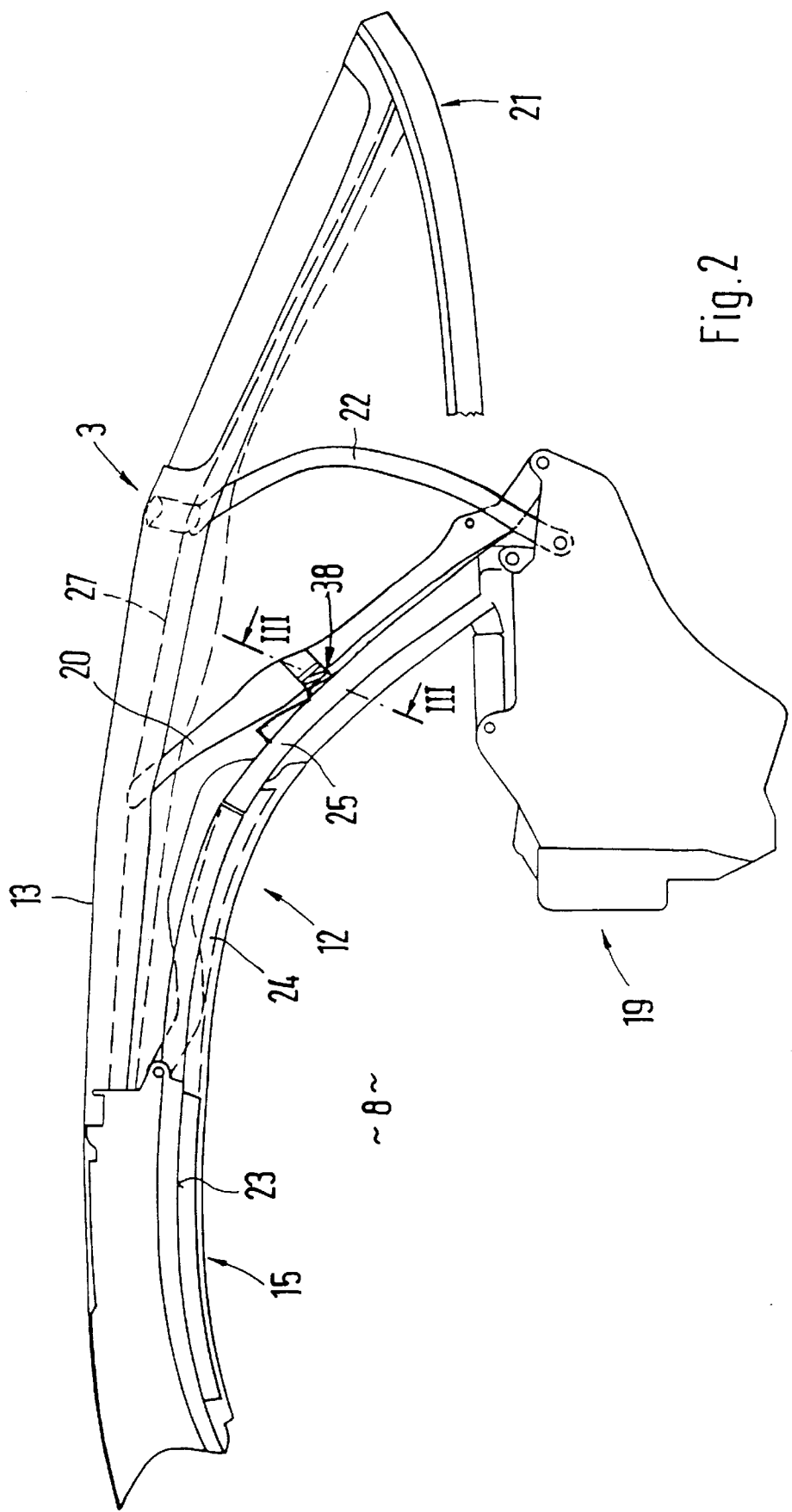
FIG. 2 is a partial lateral view of the folding top in the closed position with the adjusting devices between the main hoop and the control arm disposed in front of it.
Figure 5:
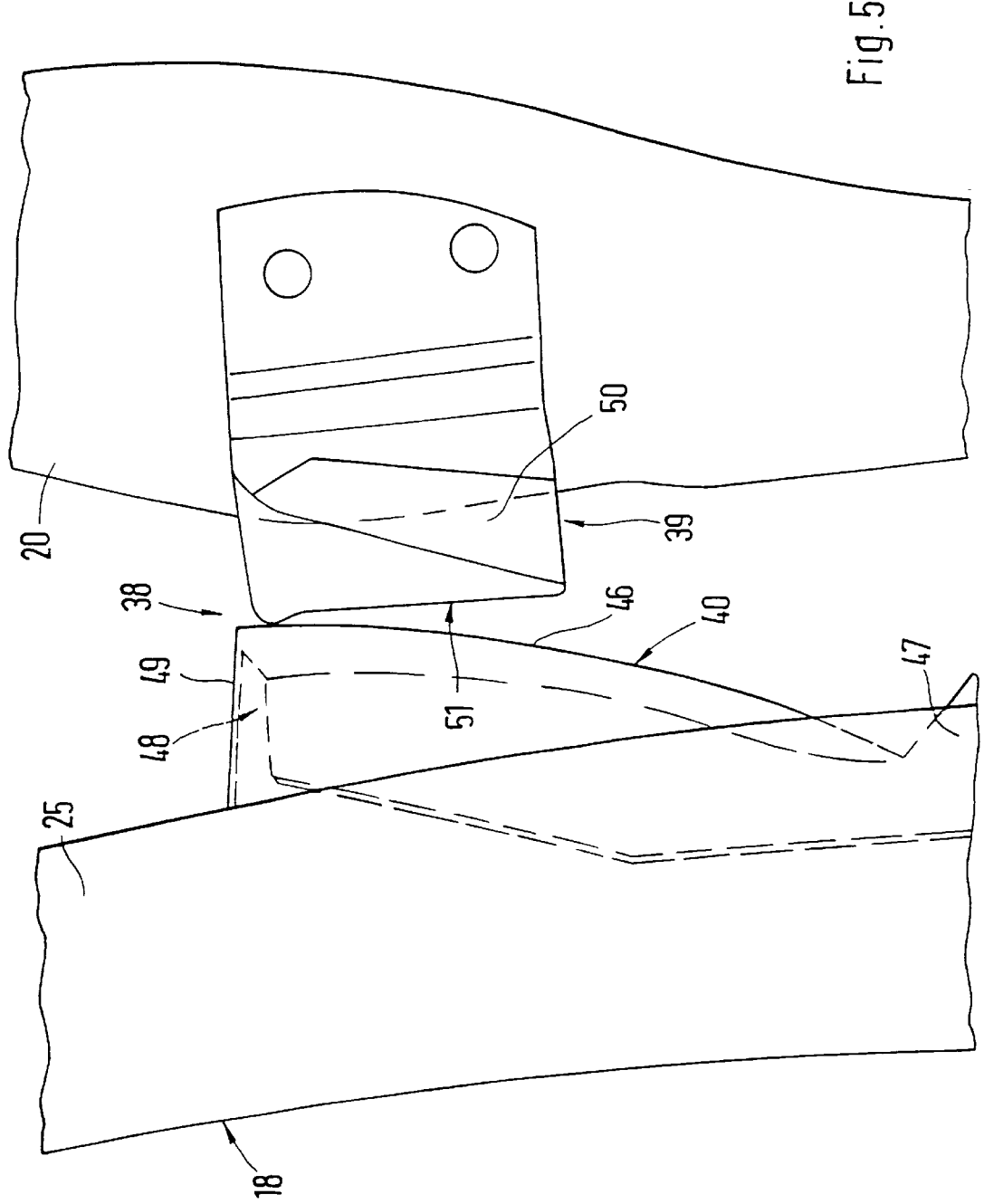
FIG. 5 is an enlarged view of a detail X of FIG. 4.

FIG. 1 illustrates a partial area of a passenger car 1 which has a folding top 3 above a belt line 2. In the closed position A, the folding top 3 extends between a windshield frame 4 and a rear area 5 of the vehicle and is detachably held in position at the windshield frame 4 by way of at least one lock which is not shown in detail. The windshield frame 4 accommodates a windshield 6. In the rear area 5, a pivotable folding top compartment lid 7 is illustrated which at least partially covers a folding top compartment situated underneath. When folding top 3 is in the folded-back, rear-side deposited position, folding top 3 is positioned within the folding top compartment. A passenger space 8 of the passenger car 1, which in the embodiment has 2+2 seating, is accessible by side doors 9. Doors 9 have door windows 10 above the belt line 2 which have a frameless construction. Lowerable rear side windows 11 adjoin the door windows 10 toward the rear.

The folding top 3 is composed of a folding top structure 12 and an elastic folding top covering which is locally held in position on the folding top structure 12. In the rear area 13 of the folding top covering, a viewing window 14 is provided which is formed by a flexible or rigid rear window.

The folding top structure 12 comprises essentially a large-surface, dimensionally stable folding top section 15 which is arranged adjacent to the windshield frame 4. The two laterally exterior longitudinal sides 16 of top section 15 are each pivotally disposed on folding top bases 19 mounted by way of two control arms 17, 18 thereby forming a four bar linkage on the vehicle body side (FIG. 4).

In addition, the folding top structure 12 comprises a main hoop 20 that is pivotally disposed on the two folding top bases 19, a rear-side tension bow 21 hinged to the main hoop 20 and a corner hoop 22. The corner hoop 22 is also pivotally disposed on the two folding top bases 19. The corner hoop 22, the rear-side tension bow 21 and the main hoop 20 are kinematically separate from the control arms 17, 18 of the forward folding top section 15. Corner hoop 22, tension bow 21 and main hoop 20 are controlled only by way of the material fastening of the folding top covering 13. For this purpose, longitudinally directed tension belts 27 are provided on the interior side of the folding top covering 13. Tension belts 27 connect the main hoop 20, the corner hoop 22 and the rear-side tension bow 21 with the forward covering section 15 and tension the folding top covering when folding top 3 is in the closed position A.

On both longitudinal sides 16 of the passenger car 1, roof frame sections 23, 24, 25 are each connected to the dimensionally stable folding top section 15 and on the two control arms 17, 18. Roof frame sections 23, 24, 25, the folding top covering 13 and sealing bodies interacting with the door window 10 and with the rear side window 11 can be fastened to control arms 17, 18. FIG. 3 shows the sealing body 26 for the roof frame section 25.

When folding top 3 is in the closed position A, the roof frame sections 23, 24, 25 adjoin one another flush with the body shell to form a three-piece lateral roof frame. The two roof frame sections 23, which are in a longitudinal forward position in the closed position A, are constructed in one piece with the forward dimensionally stable folding top section 15, and like folding top section 15, are constructed from a light metal alloy (magnesium alloy) by casting.

The forward roof frame sections 23 extend essentially along the whole longitudinal course of the dimensionally stable folding top section 15.

The roof frame section 24 which, viewed in the driving direction B, is provided on the forward control arm 17. Frame section 24 is arranged such that, in the closed position A a narrow first joint 28 is formed when it adjoins and is aligned with the rearward edge of the forward roof frame section 23. The joint 28 extends in the upright direction and diagonally upwards toward the rear.

At one end, the forward control arm 17 is hinged at reference number 29 to the dimensionally stable folding top section 15 and is hinged at its other end at reference number 30 to the folding top base 19. The roof frame section 24 defines a center portion of the lateral roof frame and is formed by a cast part made of a light-metal alloy and is adjustably fastened to the control arm 17.

The roof frame section 25, viewed in the driving direction B, is provided on the rearward control arm 18 and is arranged such that when in the closed position A, forms a narrow second joint 31 as it adjoins and is aligned with the rearward end of the roof frame section 24 of the forward control arm 17. The rearward roof frame section 25 is also formed by a separate part produced in a casting operation from a light-metal alloy and is detachably, and, optionally adjustably connected with the control arm 18.

The rearward control arm 18 at one end is connected at reference number 32 to the rearward edge of the dimensionally stable folding top section 15. Control arm 18 is rotatably connected at its other end at reference number 33 to the folding top base 19. On each longitudinal side of the folding top 3, the ends 29, 30, 32 and 33 form a four bar linkage.

In the closed position A, the folding top covering 13 has an edge area 34 that projects behind the dimensionally stable folding top section 15 into a groove-shaped receiving device 35 of the roof frame sections 24, 25. The receiving devices 35 in each case are constructed on the top side of the roof frame sections 24, 25. A sealing body 36 is arranged within each receiving device 35 (FIG. 3).

The main hoop 20 is pivotal about a transversely extending, approximately horizontal axis of rotation 37 disposed on both opposite vehicle-body-side folding top bases 19. Main hoop 20 is connected with the dimensionally stable folding top area 15 situated in front only by way of one or several longitudinally directed tension belts 27. Because of the axes of rotation 33 and 37, which are arranged at a distance from one another, during the opening and closing operation of the folding top 3, main hoop 20 and control arm 18 describe different, mutually crossing movement paths, particularly in the transverse direction of the vehicle. During the opening operation of the folding top 3, the movements of the main hoop 20 and of the control arm 18 take place in a coordinated manner and no mutual distortion of the main hoop 20 and of the control arm 18 occurs.

According to the invention, an adjusting device 38 is provided between the main hoop 20 and the control arm 18, on at least one longitudinal side of the folding top 3. In the closed position A of the folding top 3, this adjusting device 38 causes a defined support between the main hoop 20 and the control arm 18. Preferably, the adjusting device 38 is provided on both longitudinal sides 16 of the folding top structure 12. Each adjusting device 38 comprises a projecting stop wedge 39 which, during the opening and closing operation of the folding top 3, interacts, at least at certain times, with an assigned stop ramp 40.

In the illustrated embodiment, a stop wedge 39 is provided on the main hoop 20, specifically on the side facing the control arm disposed in front of hoop 20. The stop wedge 39 protrudes slightly in areas with respect to the main hoop 20. As shown in FIG. 3, the stop wedge 39 comprises a bent metal support plate 41 having one leg 42 fastened by screws 43 on the main hoop 20. The other leg 45, which is provided with a casing 44 of a suitable plastic material, rubber or the like, interacts with the stop ramp 40 situated in front thereof. The stop ramp 40 is arranged on the control arm 18, specifically on the side of the control arm 18 facing the stop wedge 39. Preferably, the stop ramp 40 is constructed in one piece with the roof frame section 25 fastened to the rearward control arm 18. However, it may also be formed by a separate part which can be fastened on the control arm 18.

The stop ramp 40 is arranged in an upper area of the roof frame section 25 and is composed of a curved guideway 46 and a diagonally extending supporting wall 47 arranged at the lower edge of the guideway 46. The guideway 46 forms the top side of an approximately U-shaped molded-on portion 48 of the roof frame section 25 which is open in the downward direction, the exterior longer leg 49 of the molded-on portion 48 being connected in one piece with the roof frame section 25. The diagonally extending supporting wall 47 is placed from above on the guideway 46.

In the closed position A, a diagonally extending supporting surface 50 of the stop wedge 39 rests against the interior side of the supporting wall 47, causing a fixing in the X, Y and Z direction between the main hoop 20 and the rearward control arm 18, and the control arm 18 can therefore no longer move toward the inside. This additionally reinforces the folding top structure 12 in the closed position A. In addition, in the closed position A of the folding top 3, the interior side of the stop wedge 39 will rest locally against the corresponding control arm situated farther on the inside, whereby an additional reinforcement of the folding top structure 12 is caused.

During the opening operation of the folding top 3, the diagonally extending support surface 50 of the stop wedge 39 moves away from the supporting wall 47 of the stop ramp 40. The crowned underside 51 of the stop wedge 39 comes in contact with the guideway 46 of the stop ramp 40. During the movement of the driven control arm 18 of the folding top structure 12, the main hoop 20 situated behind is necessarily moved toward the rear. The contact between the stop ramp 40 and the stop wedge 39 takes place approximately until the main hoop 20 takes up an approximately vertical reversal position C (dead center position) (FIG. 4). Then the weight of the corner hoop 22 and of the tension bow 21, by way of the tension belts 27, pull the main hoop 20 toward the rear into the rear-side depositing position. The molded-on portion 48, which is open in the downward direction, accommodates a cable, which is not shown in detail, below the guide way 46, as a continuation of the stop ramp 40 on the roof frame section 25, several receiving sections being provided for this cable.

By means of the adjusting device 38 provided between the main hoop 20 and the control arm 18, in the closed position A, the roof frame sections 24, 25 of the control arms 17, 18 take up a defined position in the Y direction so that the edge-side moving of the folding top covering 13 into the and out of the corresponding receiving devices 35 is securely ensured during the opening and closing of the folding top 3.

During the opening operation, when the four bar linkage of the folding top is operated, the main hoop 20 is pivoted toward the rear by the defined support between the stop ramp 40 and the stop wedge 39 by way of the pivot 37 on the folding top base 19. This defined form closure is utilized in order to control in a targeted manner the relative Y direction movement between the main hoop 20 and the control arm 18. This ensures that the folding top covering 13 fastened to the main hoop 20 can move in a defined manner out of the receiving devices 35 of the roof frame sections 24, 25. This defined support will be in effect until the reversal position (dead center position) of the main hoop 20 has been reached. Then, the weights of the corner hoop 22 and of the tension bow 21, which are connected with the main hoop 20 by means of tension belts 27, will pull the main hoop 20 toward the rear.

During the closing operation, the main hoop 20 is first guided upward by means of the tension belts 27 and the folding top covering 13 until the stop wedge 39 in the reversal position of the main hoop 20, comes to rest against the stop ramp 40 of the control arm 18 disposed in front. This equilibrium can be achieved since the corner hoops 22 and the tension bow 21 are connected by the tension belts 27 and the folding top covering 13 with the main hoop 20, and these act against the main hoop 20 because of the force of their weight.

The defined form closure is utilized for controlling in a targeted manner the relative Y direction movement between the main hoop 20 and the control arm 18 disposed in front. This ensures that the folding top covering 13 fastened to the main hoop 20 can enter in a defined manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A folding top for a vehicle having a folding top structure having two longitudinal sides pivotally disposed on vehicle body side folding top bases, and having a folding too covering, the folding top structure comprising a main hoop and at least one control arm connecting a forward folding top section with the folding top base, wherein at least one adjusting device is provided between the main hoop and the control arm, the at least one adjusting device being operative during opening of the folding top and when the folding top is in a closed position thereby defining a defined support between the main hoop and the control arm, wherein the adjusting device comprises a stop wedge which, during opening and closing operation of the folding top, interacts with an assigned stop ramp.

2. A folding top according to claim 1, wherein the stop wedge is provided on the main hoop.

3. A folding top according to claim 1, wherein the stop ramp is provided on the control arm.

4. A folding top for a vehicle having a folding top structure having two longitudinal sides pivotally disposed on vehicle body side folding top bases, and having a folding top covering, the folding top structure comprising a main hoop and at least one control arm connecting a forward folding top section with the folding top base, wherein at least one adjusting device includes a stop ramp provided on the control arm, the at least one adjusting device being operative during opening of the folding top and when the folding top is in a closed position thereby defining a defined support between the main hoop and the control arm, wherein the adjusting device includes a stop wedge provided on the main hoop.

5. A folding top according to claim 4, wherein the stop wedge comprises a bent metal support plate having one leg fixed to the main hoop and another leg provided with a casing which interacts with a stop ramp.

6. A folding top for a vehicle having a folding top structure having two longitudinal sides pivotally disposed on vehicle body side folding top bases, and having a folding top covering, the folding top structure comprising a main hoop and at least one control arm connecting a forward folding top section with the folding top base, wherein at least one adjusting device is provided between the main hoop and the control arm, the at least one adjusting device being operative during opening of the folding top and when the folding top is in a closed position thereby defining a defined support between the main hoop and the control arm, wherein the adjusting device includes a stop ramp provided on the control arm.

7. A folding top according to claim 6, wherein the stop ramp is provided on a rearward side of the control arm, further wherein a four bar linkage arrangement is formed by two control arms which carries a dimensionally stable folding top section of the folding top structure.

8. A folding top according to claim 7, wherein the stop ramp is positioned in an upper area of the roof frame section and further comprises a curved guideway and an adjoining diagonally extending supporting wall wherein, in a closed position, a corresponding supporting surface of a stop wedge resting against the interior side of a supporting wall of the stop ramp, providing a fixed X, Y and Z position between the main hoop and the rearward side of the control arm.

9. A folding top according to claim 8, wherein the stop wedge and the stop ramp interact from the closed position of the folding top to approximately a vertical position of the main hoop; further wherein the weight of a corner hoop and of a tension bow, which are connected with the main hoop by tension belts, pull the main hoop toward the rear.

10. A folding top according to claim 9, wherein the stop wedge mounted on the main hoop, is also supported on the exterior side of an interior forward control arm when the folding top is in the closed position.

11. A folding top according to claim 10, wherein a guideway forms a top side of an approximately U-shaped molded-on portion of the stop ramp, and a cable guide is provided below the guideway and in its continuation in the downward direction.

12. A folding top according to claim 11, wherein the stop ramp and stop wedge define a form closure there between approximately from a closed position of the folding top to a vertical position of the main hoop.

13. A folding top according to claim 7, wherein the stop ramp is constructed on a roof frame section provided on the rearward side of control arm.

14. A folding top according to claim 6, wherein the stop ramp is constructed on a roof frame section provided on the rearward side of the control arm.

15. Folding top for an automobile, with a top frame pivotably mounted on top bearings on a vehicle body and a top covering, with the top frame having a main hoop and at least one control arm connecting a front top section with a top bearing, wherein, between the main hoop and the control arm located in front of the main hoop, at least one adjusting device is provided that acts when the folding top is opened and has a wedge that cooperates with an associated ramp, and wherein the wedge is provided on the main bow and the ramp is provided on the control arm whereby a defined support is produced between the main bow and control arm by the adjusting device in the closed position of the folding top.

16. A folding top according to claim 15, wherein one adjusting device is provided on each longitudinal side of the vehicle body.

17. A folding top according to claim 15, wherein the wedge comprises a bent metal support plate having one leg fixed to the main hoop and another leg provided with a casing which interacts with the ramp.

18. A folding top according to claim 15, wherein the ramp is provided on a rearward side of the control arm, further wherein a four bar linkage arrangement is formed by two control arms which carries a dimensionally stable folding top section of the folding top structure.

19. A folding top according to claim 18, wherein the ramp is positioned in an upper area of the roof frame section and further comprises a curved guideway and an adjoining diagonally extending supporting wall wherein, in a closed position, a corresponding supporting surface of the wedge resting against the interior side of a supporting wall of the stop ramp, providing a fixed X, Y and Z position between the main hoop and the rearward side of the control arm.

20. A folding top according to claim 19, wherein the wedge and the ramp interact from the closed position of the folding top to approximately a vertical position of the main hoop; further wherein the weight of a corner hoop and of a tension bow, which are connected with the main hoop by tension belts, pull the main hoop toward the rear.

21. A folding top according to claim 20, wherein the wedge mounted on the main hoop, is also supported on the exterior side of an interior forward control arm when the folding top is in the closed position.

22. A folding top according to claim 21, wherein a guideway forms a top side of an approximately U-shaped molded-on portion of the ramp, and a cable guide is provided below the guideway and in its continuation in the downward direction.

23. A folding top according to claim 22, wherein the ramp and wedge define a form closure there between approximately from a closed position of the folding top to a vertical position of the main hoop.

24. A folding top according to claim 15, wherein the ramp is constructed on a roof frame section provided on the rearward side of the control arm.

\* \* \* \* \*